(12) United States Patent
MacClarence

(10) Patent No.: US 7,322,495 B2
(45) Date of Patent: Jan. 29, 2008

(54) REMOVABLE POUR SPOUT

(76) Inventor: Jan MacClarence, 10840 Glazanof Dr., Anchorage, AK (US) 99507

( * ) Notice: Subject to any disclaimer, the term of this patent is extended or adjusted under 35 U.S.C. 154(b) by 222 days.

(21) Appl. No.: 11/191,556

(22) Filed: Jul. 28, 2005

(65) Prior Publication Data

US 2007/0023463 A1    Feb. 1, 2007

(51) Int. Cl.
*B65D 25/48* (2006.01)
(52) U.S. Cl. .................. 222/570; 222/571; 222/573
(58) Field of Classification Search ............... 222/567, 222/569, 570, 571, 573
See application file for complete search history.

(56) References Cited

U.S. PATENT DOCUMENTS

| | | | |
|---|---|---|---|
| 2,071,638 A * | 2/1937 | Lauterbach | 222/569 |
| 2,783,924 A * | 3/1957 | Hayes | 222/569 |
| 3,102,667 A * | 9/1963 | Ullevig | 222/569 |
| 3,272,407 A * | 9/1966 | Ottestad | 222/569 |
| 3,940,036 A | 2/1976 | Parker | |
| 4,052,934 A | 10/1977 | Shinman | |
| 4,518,094 A | 5/1985 | Kodman | |
| 5,472,121 A | 12/1995 | Silano | |
| 5,491,869 A | 2/1996 | Sullivan et al. | |
| 5,579,963 A | 12/1996 | Murthi | |
| 6,357,452 B2 | 3/2002 | Bolito | |
| 6,745,923 B2 | 6/2004 | Julian | |
| 7,207,466 B2 * | 4/2007 | Walsh et al. | 222/111 |

* cited by examiner

*Primary Examiner*—Joseph A. Kaufman
(74) *Attorney, Agent, or Firm*—Michael J. Tavella

(57) ABSTRACT

A pour spout for removable attachment to a container wall for efficiently pouring viscous liquids between containers includes a generally flexible exterior member having a pour region and a collection region. The exterior member defines a slot for removably receiving a container wall, the exterior member flexibly conforming to the diameter of the container wall. The collection region is situated adjacent the inner wall of the container wall when attached thereto and is configured to guide liquids toward an outwardly extending pour region and channel. At least one clip is attached to the exterior member in an over-molded construction and is situated in the slot. The clip includes attachment members biased toward each other for securely gripping the container wall when the slot and clip are engaged therewith.

2 Claims, 3 Drawing Sheets

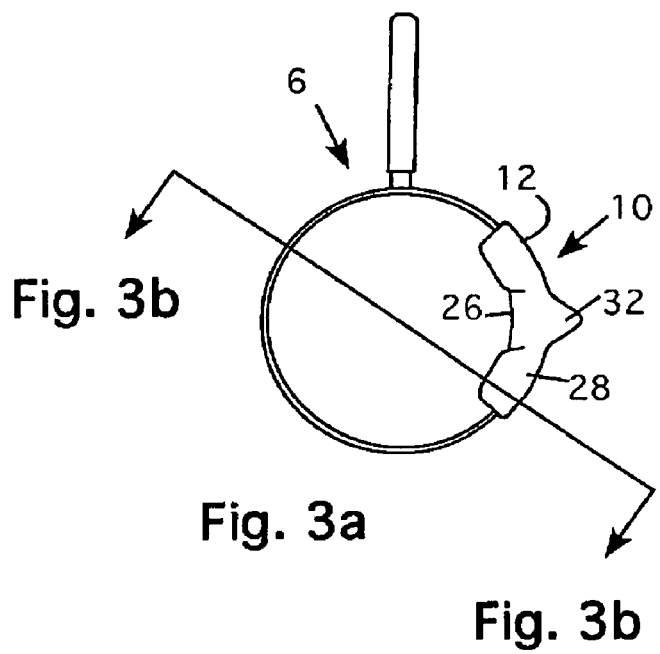
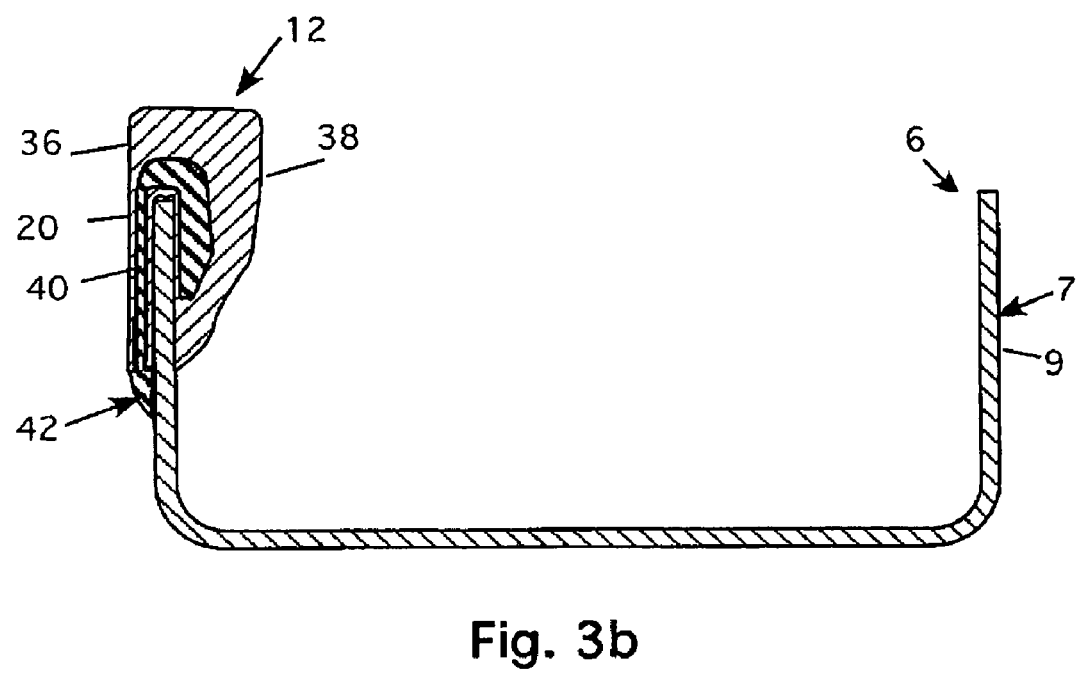

REMOVABLE POUR SPOUT

BACKGROUND OF THE INVENTION

This invention relates generally to a pour spout and, more particularly, to a pour spout attachable to a container wall for efficiently pouring viscous liquids between cookware vessels.

Pouring liquids from cooking pots has always been a difficult task and one that often results in spillage. Viscous liquids tend to cling to the side of the container and resist smooth and efficient pouring from one vessel to another. The action of pouring liquids, such as while cooking, often results in foodstuffs clinging to or dribbling down the side of a pot or pan.

Various proposals for pour spout devices are found in the art. While assumably effective for their intended purposes, the existing devices are generally unable to attach to containers having different heights and diameters or to withstand the high temperatures often experienced in cooking.

Therefore, it is desirable to have a pour spout that effectively eliminates the mess associated with pouring from a pot or pan, accommodates cookware having different heights and diameters, accounts for high temperatures, is easy to attach and remove from containers, and is easy to clean.

SUMMARY OF THE INVENTION

A pour spout for removable attachment to a container wall according to the present invention includes an exterior member having a pour region, a collection region, and first and second sides defining a slot for engaging the container wall. The pour spout further includes at least one rigid clip member situated inside the exterior member adjacent the sides of the slot for securing the exterior member to the sides of the container wall. The exterior member is constructed using a semi-flexible silicone material, making the pour spout capable of being modestly bent to fit many sizes and varieties of cookware. More particularly, the exterior member is a silicone over-molding that envelopes the rigid clips.

Therefore, a general object of this invention is to provide a pour spout attachable to a container wall for efficiently pouring viscous liquids from one container to another.

Another object of this invention is to provide a pour spout, as aforesaid, having a generally flexible outer construction such that the pour spout may be used on containers having different heights and diameters.

Still another object of this invention is to provide a pour spout, as aforesaid, that defines a slot for attachment to a container wall.

Yet another object of this invention is to provide a pour spout, as aforesaid, having at least one rigid clip situated within the flexible exterior member for securing the pour spout to a container wall.

A further object of this invention is to provide a pour spout, as aforesaid, in which the exterior member is a silicone over-molding enveloping the clips.

A still further object of this invention is to provide a pour spout, as aforesaid, in which the exterior member includes a shutoff construction where the clip extends from the exterior member.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 3a is a top view of the pour spout as in FIG. 1; and

FIG. 3b is sectional view of the pour spout taken along line 3b-3b of FIG. 3a.

DESCRIPTION OF THE PREFERRED EMBODIMENT

Figure 1:
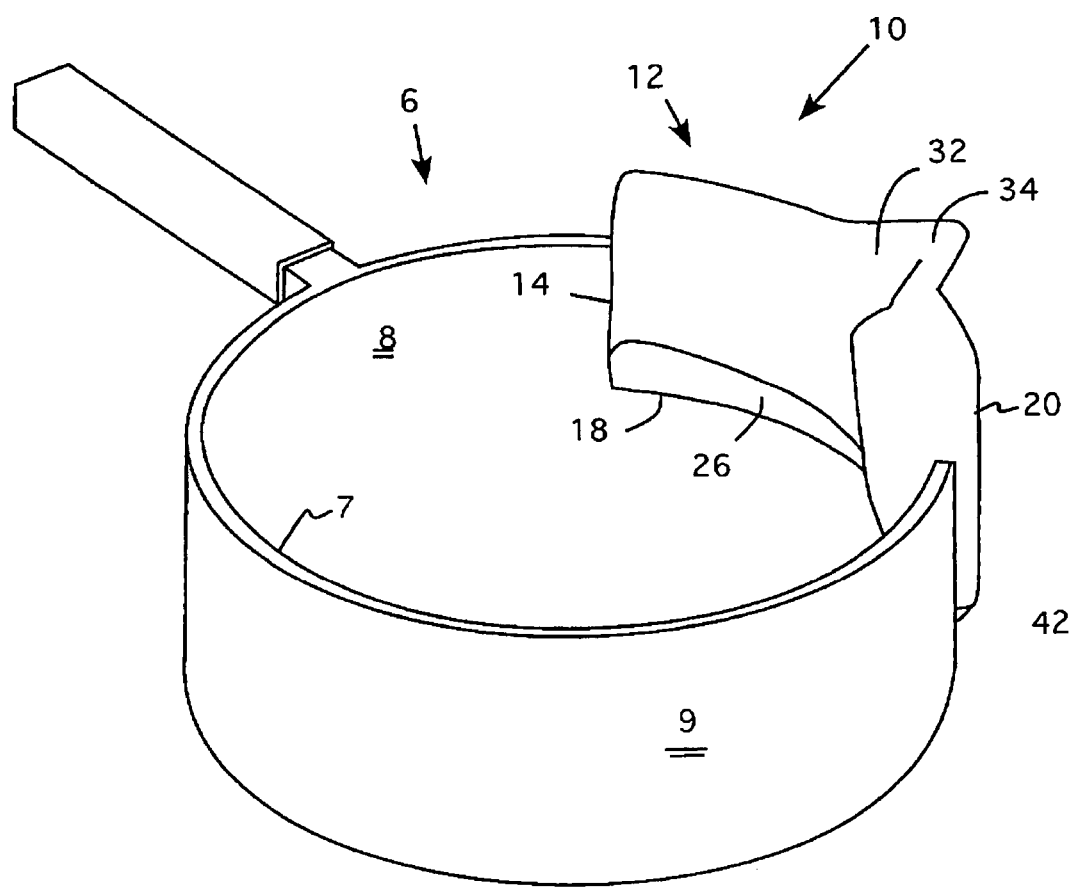
FIG. 1 is a perspective view of a pour spout according to the present invention attached to the wall of a cooking container.

A pour spout 10 for pouring viscous liquids from one container to another according to the present invention will now be described in detail with reference to FIGS. 1 through 3b of the accompanying drawings. In general, the pout spout 10 includes an exterior member 12 molded about at least one rigid clip 36. The exterior member 12 includes a pour region 32 and a collection region 26 for efficiently guiding a viscous liquid between containers, as will be described in more detail below. The exterior member also defines a slot 24 for removably receiving a wall of a container, such as a cooking pot or pan. Preferably, the exterior member 12 is constructed of silicone material by an over-molding process such that it is generally semi-flexible and capable of bending to fit containers having wall of various heights and diameters.

More particularly, the exterior member 12 includes a first portion 14 for being situated adjacent an inner surface 8 of a container wall 7 when the pour spout 10 is selectively attached to a container (FIG. 1). The first portion 14, therefore, may also be referred to as an inner or inward portion. Similarly, the exterior member 12 includes a second portion 20 for being positioned adjacent an outer surface 9 of the container wall 7 when the pour spout 10 is selectively coupled thereto. The second portion 20, therefore, may also be referred to as an outer or outward portion. Preferably, the exterior member 12 includes an integrated construction such that the first 14 and second 20 portions are connected along an upper edge thereof (FIG. 2).

Figure 2:
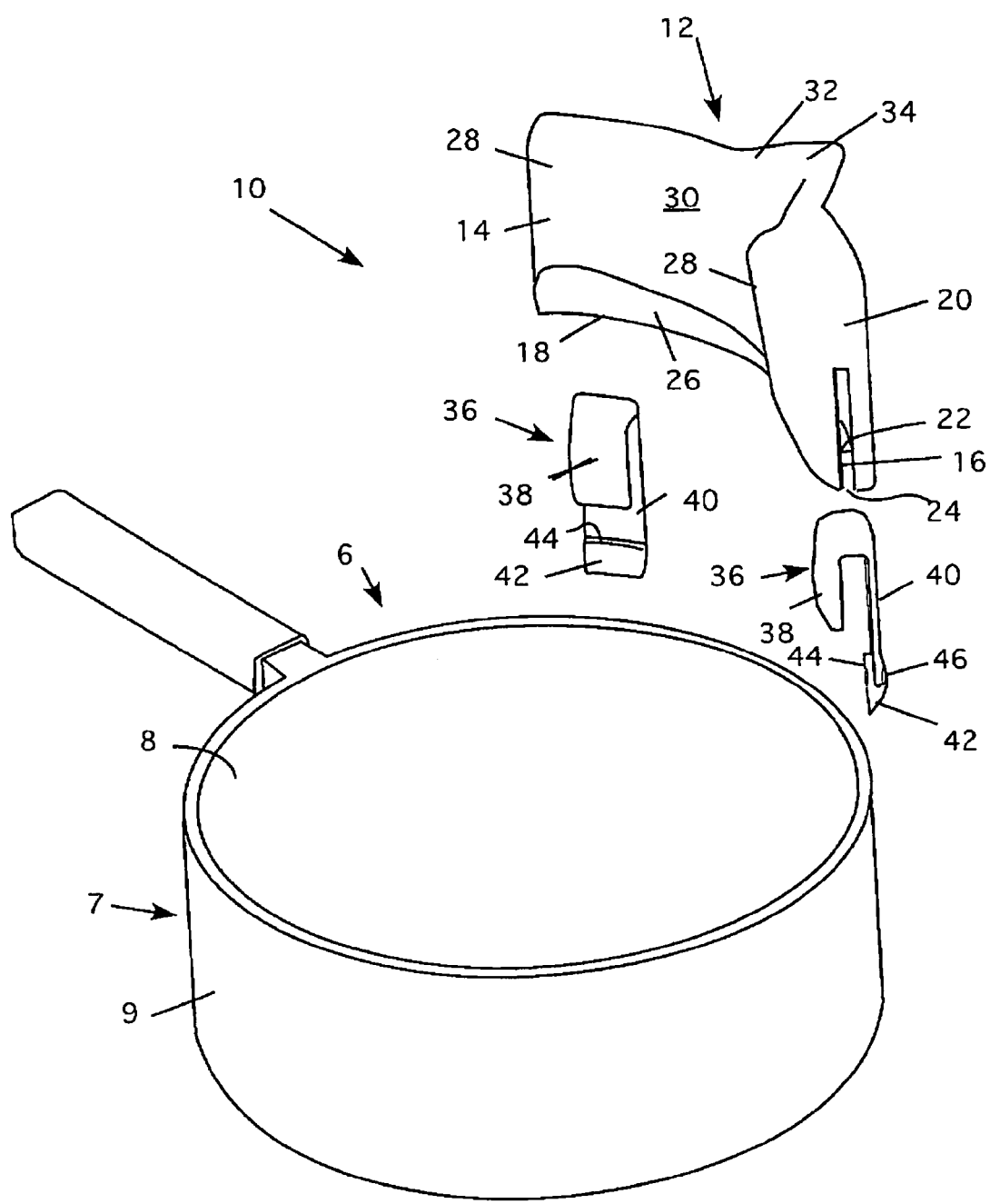
FIG. 2 is an exploded view of the pour spout as in FIG. 1.

The first 14 and second 20 portions of the exterior member 12 include respective first 16 and second 22 inner walls spaced apart from one another so as to define the slot 24 (FIG. 2). It is understood that the slot 24 presents an open bottom and extends longitudinally along the entire extent of the exterior member 12 so as to completely receive a container wall 7 therein in a mating relationship (FIG. 1). The slot 24, however, extends upwardly from its open bottom only partially toward the upper edge of the exterior member such that the top of the exterior member is closed (FIG. 2).

The collection region 26 and pour region 32 of the exterior member 12 present a configuration for the smooth and efficient pouring of viscous liquids between containers. As best shown in FIGS. 3a and 3b, the first portion 14 (inner portion) of the exterior member 12 includes a downwardly inclined configuration that tapers to a collection edge 18. In addition, the opposed side regions 28 of the first portion 14 include a thicker width dimension than a central region 30 disposed therebetween. Therefore, the configuration of the first portion 14 smoothly collects and guides liquid from the side regions 28 toward the central region 30 and to the pour region 32.

The pour region 32 is situated along the upper edge of the exterior member 12 between opposed sides thereof (FIG. 1).

The pour region 32 includes a configuration having a channel 34 projecting outwardly from the second portion 20 and interfaces with the collection region 26 for smoothly transferring liquids from the collection region to another vessel via the channel 34.

The pour spout 10 further includes at least one clip 36 being constructed of a generally rigid material although a pair of rigid clips is preferred for most applications. Each clip 36 includes first 38 and second 40 attachment members connected at an upper end in a generally inverted U-shaped configuration (FIG. 2). Therefore, each clip 36 defines an open space between respective attachment members. Each clip 36 is situated inside the exterior member 12 adjacent respective sides of the slot 24 with the end piece 42 of the second attachment member 40 extends downwardly to the slot opening. It is to be understood that the first 38 and second 40 attachment members are biased toward one another for securely gripping the container wall 7. In the case of more than one clip 36, they are preferably spaced apart from one another with respective end pieces extending from the slot 24 for efficiently gripping the container wall 7, as will be described more fully below.

Each clip 36 includes an end piece 42 at a lower end of the second attachment member 40 having a configuration that presents a first ledge 44 extending beyond an inner side of the second attachment member and a second ledge extending beyond an outer side of the second attachment member (FIG. 3b). The second ledge 46 has a configuration that enables the clip 36 to mate securely with the lower edge of the second portion 20 adjacent the slot 24. The end piece 42 is constructed of a temperature stable plastic that enables the clips 36 to be gripped tightly while the silicone material for the exterior member 12 is formed about them during the over-molding process.

The advantage of the end piece 42 is better understood along with a description of the over-molding manufacturing process. In over-molding, a soft, flexible material is injection molded over or around a compatible substrate using either insert or multi-shot processes. In the present case, it is advantageous to have a generally flexible exterior member 12 over-molded about rigid clips. The end piece 42 of the clips provides a sharp transition or a "step" between hard and soft materials and enables this process to be successfully accomplished. Specifically, the first ledge 44 provides a first step transition between the flexible and rigid materials and the second ledge 46 provides a second step transition between the flexible and rigid materials. This construction enables the advantages of flexible and rigid materials to be realized in manufacturing and use of this device.

In use, the pour spout 10 may be attached to the wall 7 of a container 6 by engaging the container wall 7 into the slot 24 (FIG. 1). The flexible exterior member 12 enables the pour spout 10 to be used with containers of various heights and diameters. The attachment members of the clips 36 are biased toward one another so as to securely hold the pour spout 10 to the container wall 7. Liquids may then be poured from the attached container 6 by tipping the container gradually in the direction of the pour region 32. The configurations of the collection region 26 and pour region 32 cooperate to smoothly pour viscous liquids. If desired, the pour spout 10 may then be slidably removed from the container wall 7 for cleaning, storage, or to attach to another container.

It is understood that while certain forms of this invention have been illustrated and described, it is not limited thereto except insofar as such limitations are included in the following claims and allowable functional equivalents thereof.

What is claimed is as follows:

1. A spout for removable attachment to a container wall, said spout comprising:
   a exterior member having a pour region and a collection region and having first and second inner sides defining a slot for selectively mating with the container wall;
   a clip attached to said exterior member, said clip being positioned inside said exterior member adjacent said slot first and second sides for securing said exterior member to the container wall;
   wherein said clip has first and second attachment members and defines an open space therebetween;
   wherein said first attachment member is positioned inside said slot adjacent said first inner side;
   wherein said second attachment member is positioned inside said slot adjacent said second inner side;
   an end piece attached to a lower end of said second attachment member, said end piece forming a ledge extending beyond an inner side of said second attachment member, said end piece forming a ledge extending beyond an outer side of said second attachment member;
   wherein said exterior member is constructed of a flexible material;
   wherein said clip and said end piece are constructed of a rigid material, said exterior member and said clip being connected in an over-molding process;
   wherein said first ledge forms a first step transition between said flexible material and said rigid material; and
   wherein said second ledge forms a second step transition between said flexible material and said rigid material; and
   wherein said flexible material extends beyond said first ledge at said first step transition to keep said end piece from directly contacting the container wall when the container wall is engaged in said slot.

2. The spout as in claim 1, wherein: said collection region includes an inclined configuration that smoothly tapers to a collection edge; and
   said pour region has a contour that smoothly transitions said collection region into a channel projecting outwardly from said collection region.

* * * * *